United States Patent [19]

Minnetti

[11] Patent Number: 4,697,690

[45] Date of Patent: Oct. 6, 1987

[54] SYSTEM AND A PROCESS FOR ORIENTING AS REQUIRED BORED FRUSTO-CONICAL AND/OR CYLINDRICAL BODIES, USUALLY YARN REELS OR CONES FED IN BULK

[75] Inventor: Federico Minnetti, Pistoia, Italy

[73] Assignee: Officine Minnetti di Federico Minnetti & C.S.a.s., Pistoia, Italy

[21] Appl. No.: 741,189

[22] Filed: Jun. 4, 1985

[30] Foreign Application Priority Data

Jun. 4, 1984 [IT] Italy ................. 21237 A/84

[51] Int. Cl.$^4$ ............................................. B65G 43/08
[52] U.S. Cl. ................................. 198/395; 198/399; 198/400; 198/416; 414/783; 242/35.5 A
[58] Field of Search ............... 198/395, 399, 401, 409, 198/416, 394, 400, 410, 403, 390, 453, 633, 411, 398, 382, 444; 242/35.5 A; 414/783, 754, 757, 908; 901/35, 47, 33, 34; 221/171, 173; 209/538, 539, 540, 548, 600, 619, 688

[56] References Cited

U.S. PATENT DOCUMENTS

| | | |
|---|---|---|
| 2,652,140 | 9/1953 | Hall .................. 198/411 X |
| 3,361,246 | 1/1968 | Kukawski .................. 198/394 X |
| 3,592,326 | 7/1971 | Zimmerle et al. ............ 198/395 X |
| 3,906,712 | 9/1975 | Miyazaki et al. .......... 242/35.5 A X |
| 3,924,732 | 12/1975 | Leonard .................. 198/398 X |
| 4,333,558 | 6/1982 | Nonaka et al. .................. 198/395 X |
| 4,565,278 | 1/1986 | Asai et al. .............................. 198/400 |

FOREIGN PATENT DOCUMENTS

| | | | |
|---|---|---|---|
| 0053588 | 6/1982 | European Pat. Off. ............ | 198/416 |
| 0113125 | 7/1984 | European Pat. Off. ............ | 198/395 |
| 2201013 | 7/1973 | Fed. Rep. of Germany . | |
| 1411937 | 8/1965 | France . | |
| 58-139979 | 8/1983 | Japan .............................. | 242/35.5 A |
| 6503257 | 9/1966 | Netherlands ........................ | 198/382 |
| 1179146 | 1/1970 | United Kingdom . | |
| 460846 | 4/1975 | U.S.S.R. .............................. | 198/382 |

Primary Examiner—Robert J. Spar
Assistant Examiner—Jonathan D. Holmes
Attorney, Agent, or Firm—Fleit, Jacobson, Cohn & Price

[57] ABSTRACT

Frusto-conical or cylindrical reels or cones are first oriented with their axes perpendicular or parallel to the axis of a conveyor belt. Then, by a tilting device actuated by a detector device for detecting the position of a through hole in a reel, the reels or cones are all arranged with their axes parallel to the axis of the conveyor belt. In the case of frusto-conical reels or cones a further detector actuates a device for rotating the reels or cones about a vertical axis. The system includes a slanting plate for rectifying the position of the reels or cones, the tilting device and relative detector and the rotating device and relative detector. All these devices can be removed selectively and a flag-shaped device is provided for fitting to the system in order to adapt it for use with disk-shaped reels.

8 Claims, 23 Drawing Figures

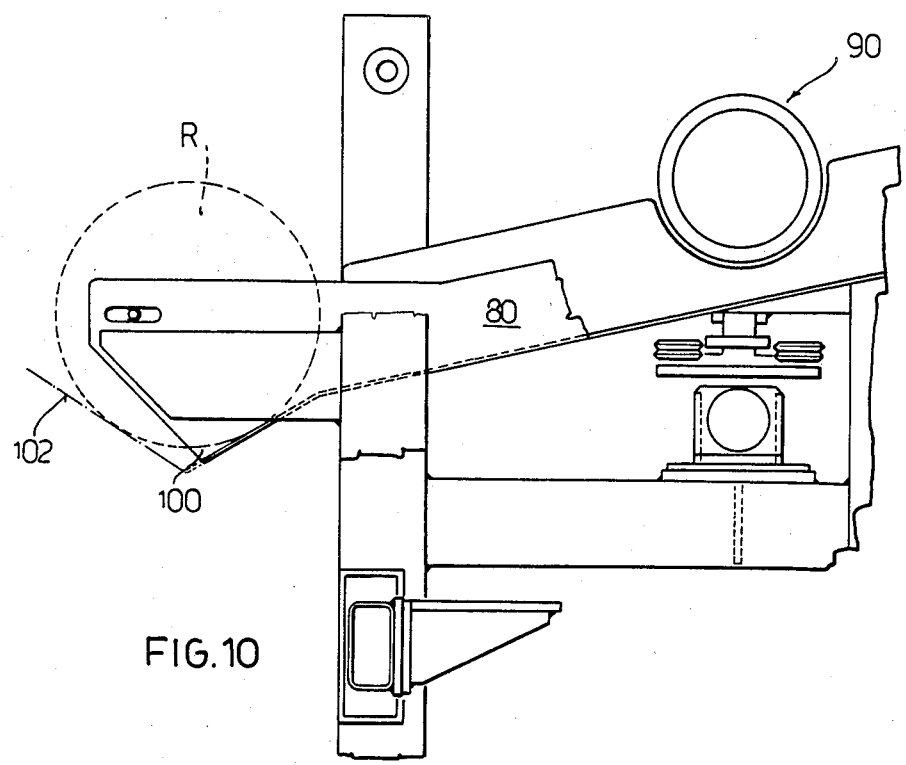
FIG.10
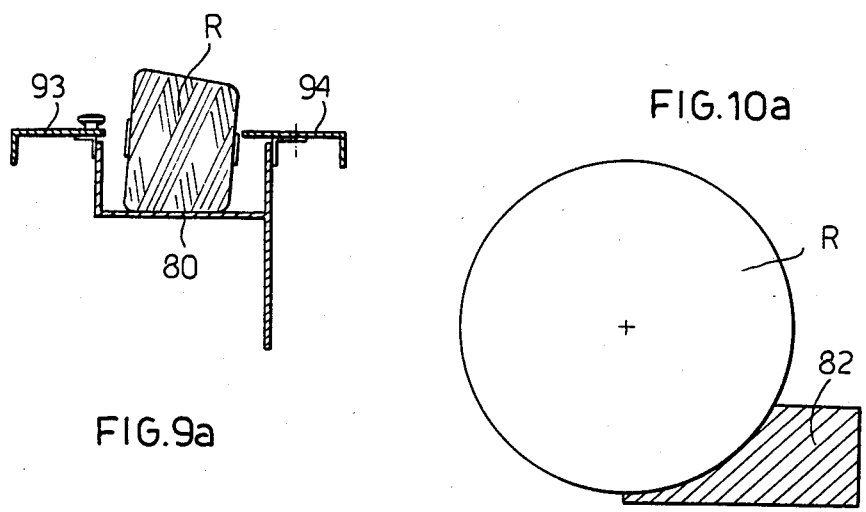
FIG.9a
FIG.10a

SYSTEM AND A PROCESS FOR ORIENTING AS REQUIRED BORED FRUSTO-CONICAL AND/OR CYLINDRICAL BODIES, USUALLY YARN REELS OR CONES FED IN BULK

There is a growing tendency in the field of yarns, in relation to the systems for treating it at various stages, like for example dyeing, to use systems which allow as fully automated handling of the yarns as possible, with minimum manual intervention. When the yarn is wound in frusto-conical reels (cones), in cylindrical or disk-shaped reels (the latter are cylindrical reels which are larger in size across than along their axis), a problem arising with these systems is orienting the reels which are fed in bulk and must reach the pick-up device or devices for carrying out set operations in a determined attitude. By reel or cone is meant the result of winding yarn on a core with a through hole, said core being cylindrical for cylindrical reels and frusto-conical for frusto-conical reels or cones.

For yarns wound in frusto-conical or cylindrical reels a previous application from the same applicant describes a process and system for orienting said bulk-fed reels, so that they reach a pick-up device orderly aligned with the larger end facing forwards. This previous system has various in-line conveying sections, one of which uses fixed slanting walls with a conveyor belt at the bottom, while another uses inclined conveyor belts running along the walls, in order to achieve the required orientation of the reels.

Although the previous system signified a valid inventive progress in the field, it nevertheless displayed some limitations, either because it sometimes lets reels through in an incorrect attitude or there are problems in adapting to different-sized reels or, finally, due to the difficulty in adapting it to cylindrical or disk-shaped reels.

Therefore an object of the present application is to realize a system and a process for orderly arranging the reels which are reliable, are easy to adapt to different-sized reels, can easily be adapted to working with conical, cylindrical or disk-shaped reels and are fully automatic.

The new system and process achieve an optimum arrangement of the outgoing reels. They allow the reels not meeting the set criteria for attitude and size to be eliminated in advance. Furthermore, the system can be easily adapted to conical, cylindrical or disk-shaped reels and to various sizes of the same. They are completely safe to operate. In addition, with the new system there is no, or only a very slight, trouble for the yarn wound into reels, due to the absence of rubbing.

Although the system has been designed and realized with regard to handling yarn reels, provision is made for it to also be used in other fields, in which for whatever reason bored frusto-conical or cylindrical bodies must be arranged in an orderly alignment.

An exemplary unrestrictive embodiment of said system is described below with reference to the accompanying drawings, in which.

Figure 1:
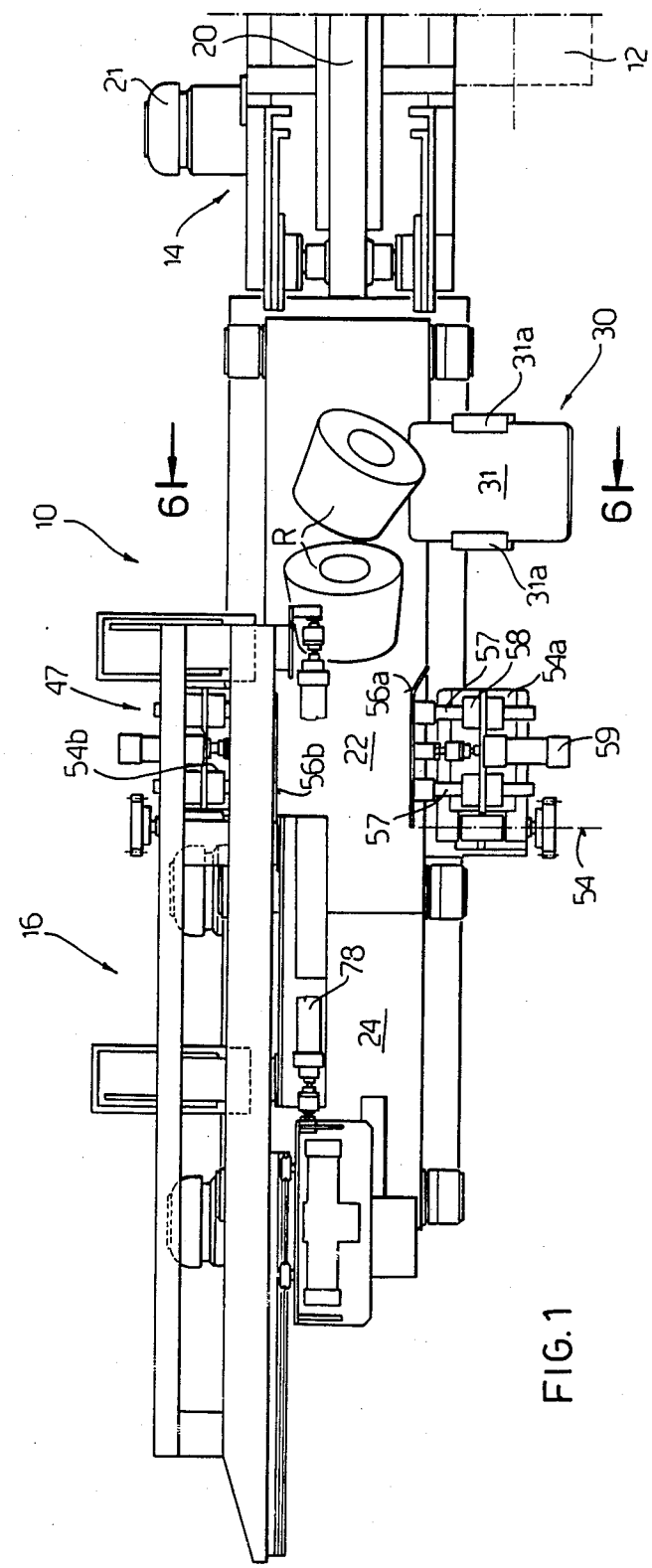
FIG. 1 is a segmentary plan view of a first part of the system (orientation unit) according to the invention.
Figure 4A:
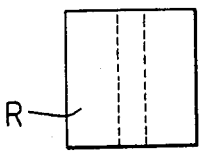
Figure 4B:
Figure 4C:
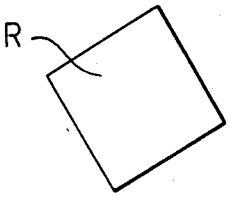
Figure 5A:
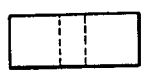
Figure 5B:
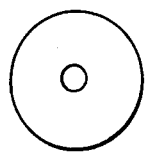
Figure 6:
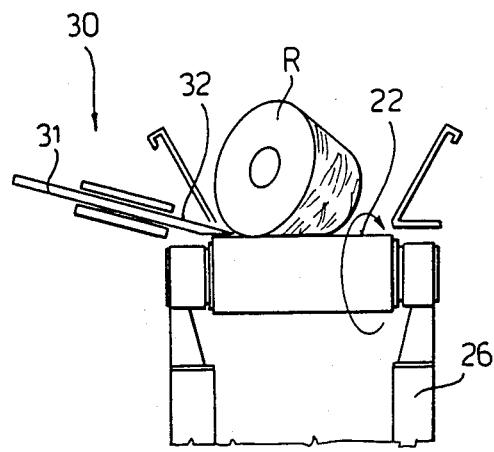
Figure 7:
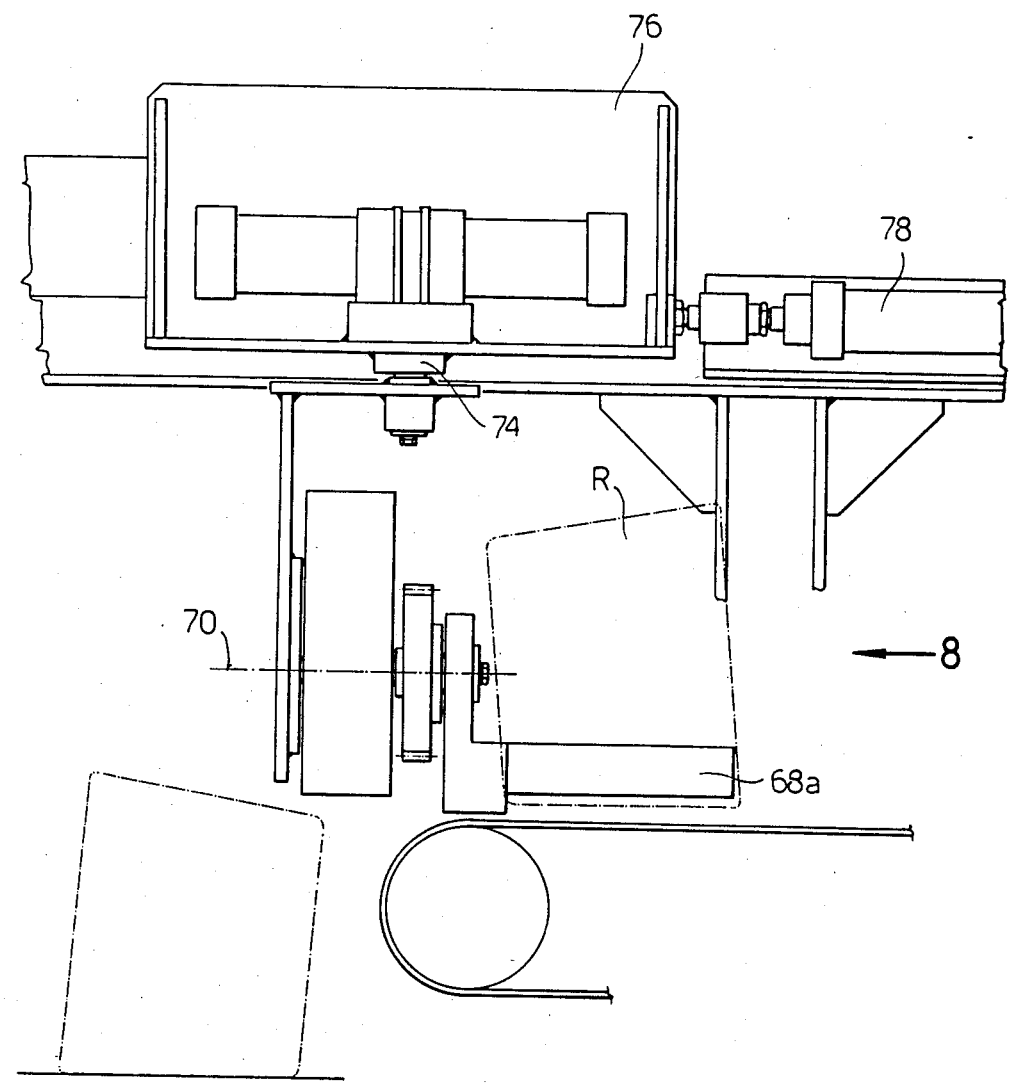
Figure 8:
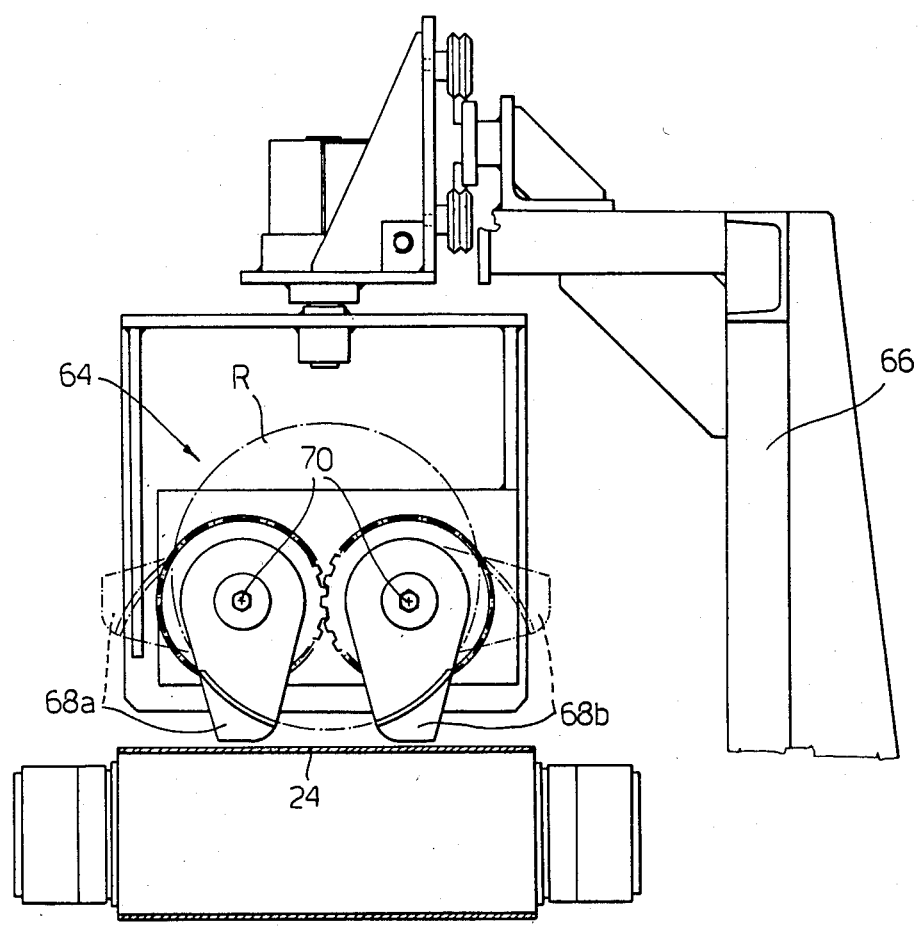
Figure 9:
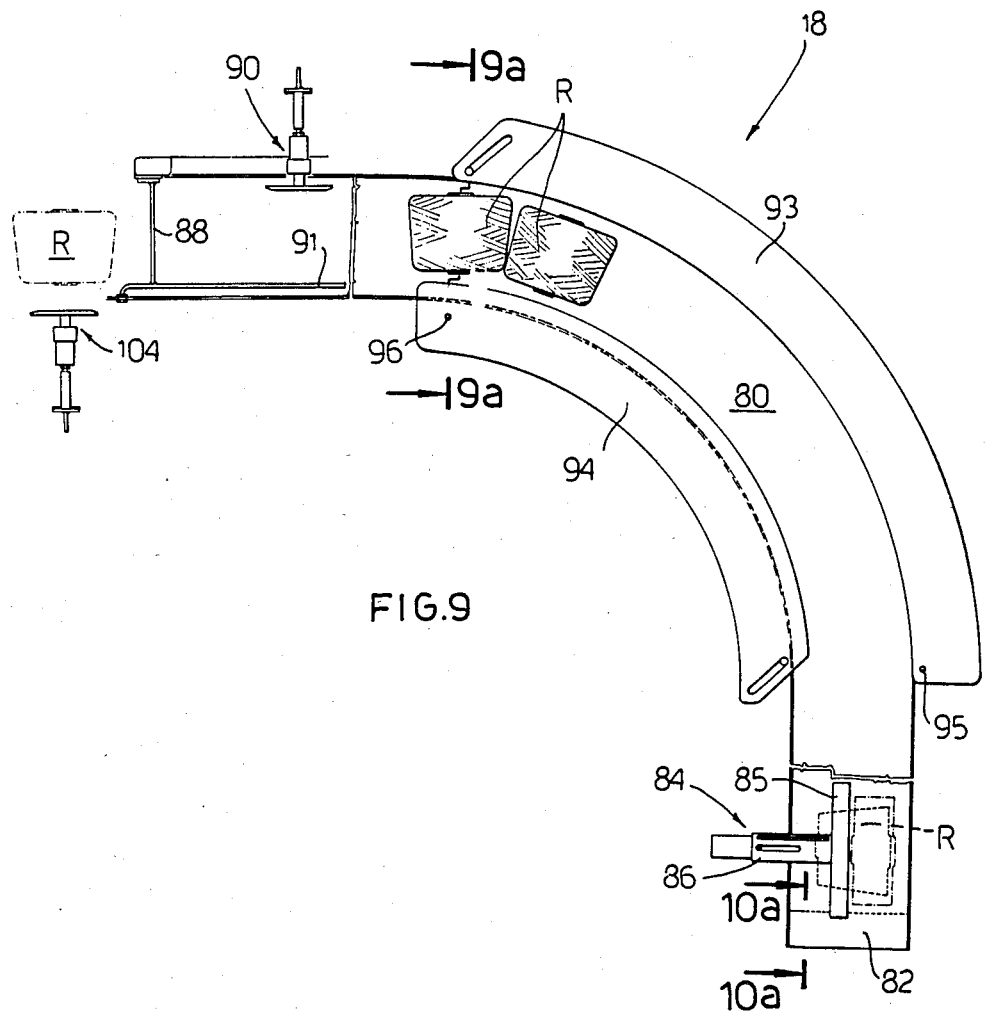
Figure 11:
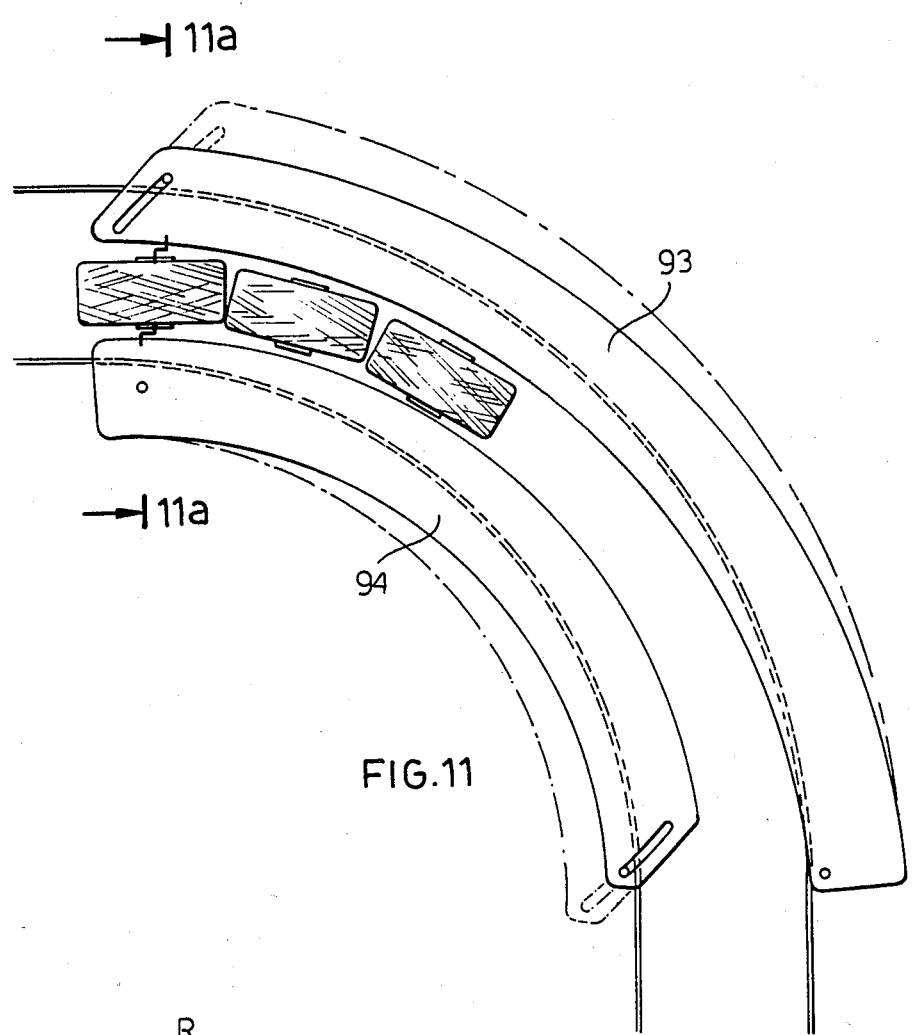
Figure 11A:
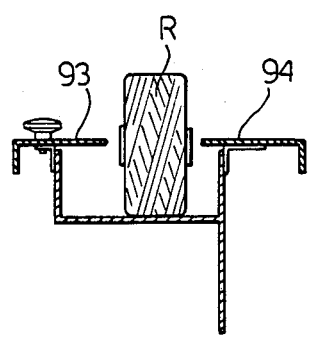
Figure 13:
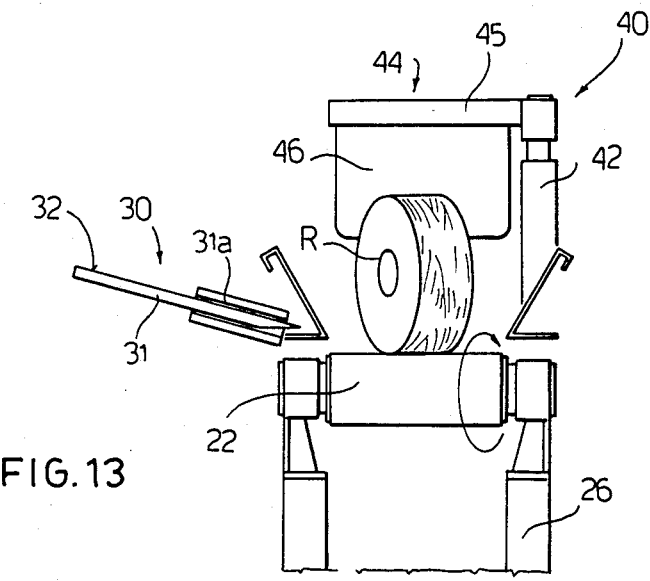
Figure 12:
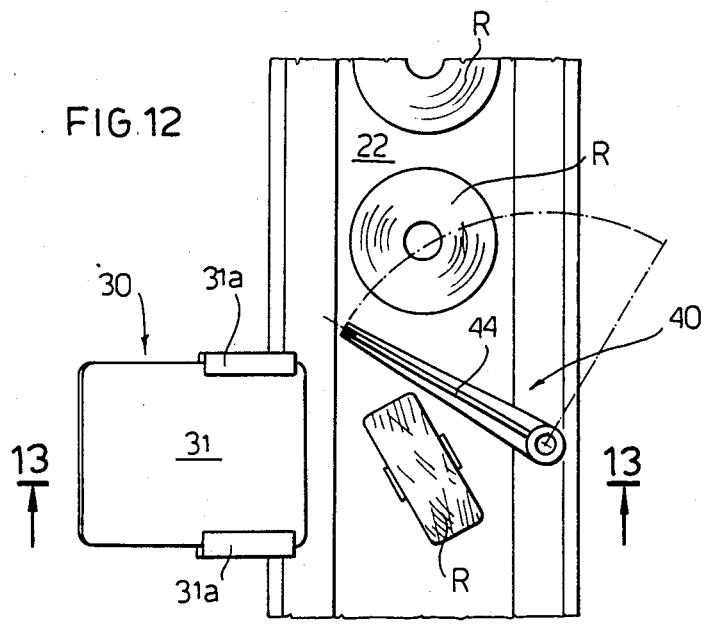

FIGS. 4a, 4b, and 4c show a cylindrical reel in various positions, seen from above;

FIGS. 5a and 5b show a disk-shaped reel in two positions, seen from above;

FIG. 6 is a sectional view along 6—6 in FIG. 1;

FIG. 7 is an enlarged, partly vertical sectional view of a cradle or blade type rotating device;

FIG. 8 is a view as seen from arrow 8 in FIG. 7;

FIG. 9 is a plan view of a feeder-loader unit in the system, arranged for use with cylindrical or conical reels or cones;

FIG. 9a is a sectional view along 9a—9a in FIG. 9;

FIG. 10 is a segmentary front view of the unit in FIG. 9;

FIG. 10a is a sectional view along 10a—10a in FIG. 9;

FIG. 11 is a top view similar to FIG. 9, but the unit is shown as adapted for use with disk-shaped reels;

FIG. 11a is a sectional view along 11a—11a in FIG. 11;

FIG. 12 is a plan view of one section of an orientation unit as adapted for use with disk-shaped reels;

FIG. 13 is a view from 13—13 in FIG. 12.

Figure 2:
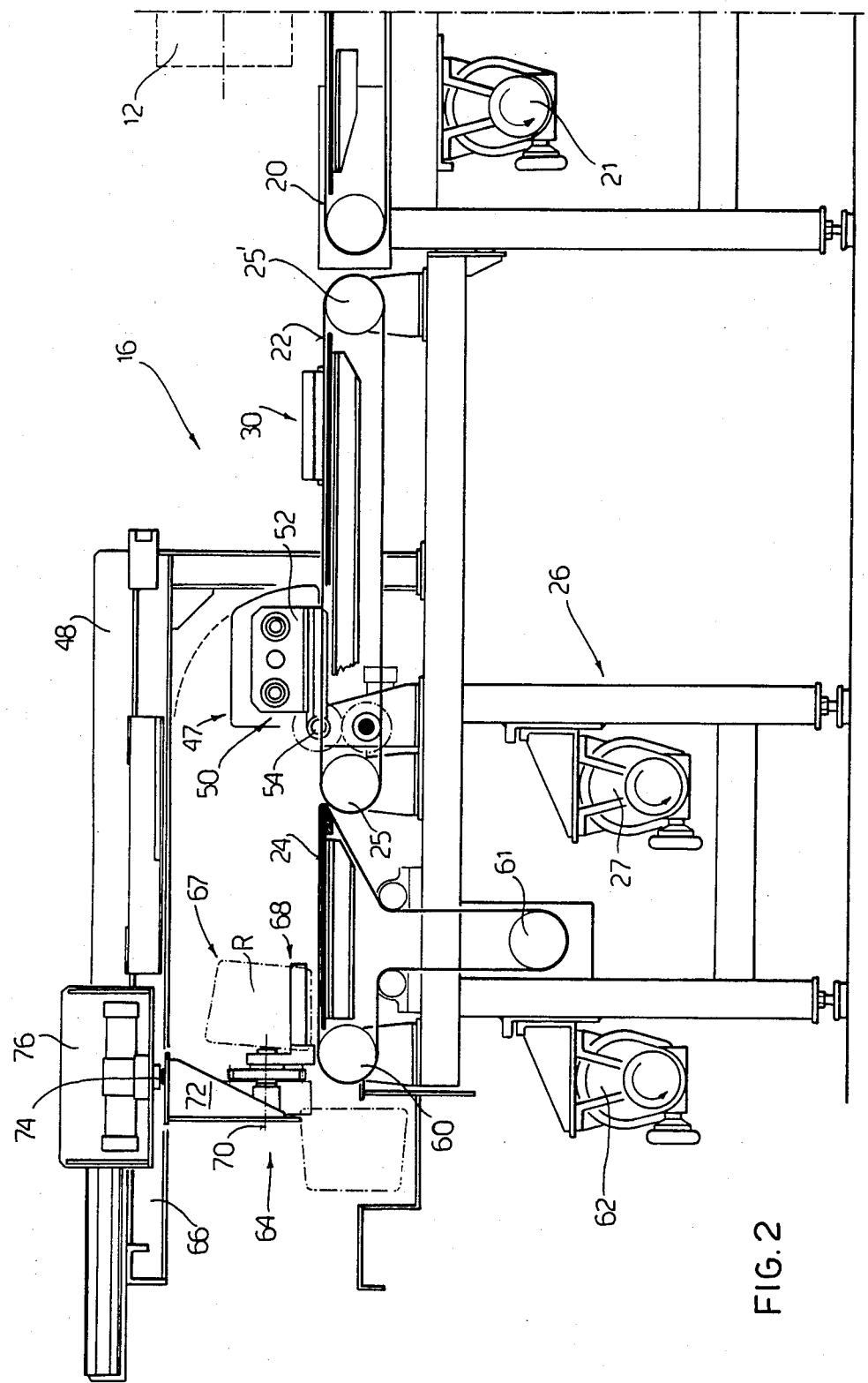
FIG. 2 is a front view of the part of the system shown in FIG. 1.

A system 10 according to the present invention is bulk-fed with reels R from a wheel with radial blades, indicated generally by 12 in FIGS. 1 and 2. Any kind of loading tables or conveyor devices—not described, because already known—may be provided upstream of the wheel. A preferred wheel is a type shown in a previous patent application of the same applicant (disclosed in Italian application Ser. No. 25041 A/82, filed on Dec. 30, 1982) and comprises four or more radial blades. Each pair of blades defines a space for receiving a row of reels and transferring them into the system.

Said system 10 is fed by a conveyor unit 14, usually a belt-type one, and comprises an orientation unit 16 and possibly a feeder-loader unit 18. The conveyor-belt unit may be of any known type and will not, therefore, be described in detail. The preferred kind is a dented belt 20 driven by a motor 21 and actuated by the presence of reels in the orientation unit 16.

The orientation unit 16 comprises a first conveyor belt 22 and a second conveyor belt 24. In the examplary embodiment both are shown assembled on the same fixed stand 26. The belt 22 runs on rollers 25, 25' driven by a motor 27. Either a slanting plate device 30, shown in FIGS. 1, 2 6 and 12, or a flag-shaped device 40, shown in FIGS. 12 and 13, may be interchangeably fitted on a first section of belt 22. The slanting plate device has a plate 31 which slides in guides 31a between an extended position and a retracted position. In the first position it extendsd over one section of the belt from one side of the conveyor belt and has a slanting upper surface 32, so that the part furthest away from the center line of the belt is higher and the part nearest the center line is basically level with the belt. A particularly suitable angle of inclination is about 15° from the horizontal. It is preferable to provide that surface 32 be especially smooth and frictionless.

The flag-shaped device comprises a support 42 which can be fixed to a stationary stand 26 and a flag-shaped or overhanging arm 44, held by said support, which can be moved between a position over the conveyor belt 22 (continuous line in FIG. 12) and a position outside said belt (broken line in the same figure).

In the position above the belt 22 the arm 44 is set at an angle with respect to the belt's longitudinal axis, preferably of about 60°. The preferred type of arm consists of a rib 45, generally horizontal and rigid, and a flap 46 made of a flexible material which hangs from the rib.

Above a second section of the first belt 22 the orientation unit 16 has a tilting unit 47, made up of a device 48 for detecting the hole in the reels and a tilting device 50 operated by the detecting device, and cooperating therewith. The detecting device 48, not shown in detail, comprises a system of photocells for indicating presence of a vertical through hole (or horizontal through hole) in a stationary reel on the belt. The tilting device 50 comprises a frame 52 pivoted on a horizontal axis 54. Said frame 52 consists of two arms 54a and 54b, each one holding a jaw, 56a and 56b respectively. The two jaws can move towards and away from one another across the belt's longitudinal axis. Each jaw is attached to guide bars 57, which slide in guide sleeve 58, and is moved by a cylinder-piston 59. The frame 52 rotates for about 90° on the axis 54, as shown by the broken lines in FIG. 2, in order to tilt the jaws 56a and 56b through 90°.

The second conveyor belt 24 in the orientation unit has a "pen-type" end facing towards belt 22, and driven by motor 62 it moves around rollers 60 and 61. A unit for rotating the reels, indicated globally by 64, is mounted on a fixed structure 66 at the side and above belt 24 and comprises a detecting device (not shown) and a pick-up device 68 with blades or a cradle. The latter is held by a braket 72 connected to a vertical hub 74 (FIGS. 2 and 7). The hub is housed in a carriage 76 so as to be rotatable about its vertical axis, said carriage being able to traverse horizontally on a fixed structure 66, and being driven by a cylinder-piston unit 78, so that it can make a short and a long run, as will be explained in more detail below. The pick-up device comprises a pair of blades 68a and 68b, which rotate on parallel horizontal axes 70 between a spread apart position (shown by broken lines in FIG. 8) and a closed position (shown by continuous lines in FIG. 8). Preferably the blades' contact or seizing surfaces are arc-shaped in front view, as seen in FIG. 8. In the closed position the blades hold a reel R between them and in the spread apart position the space between them is greater than the diameter of a reel, so that any reel held by them is dropped. The detecting device is for detecting whether a reel has its larger or smaller end facing forwards. Said device is of a known type (for example, as in the said preceding application of the same applicant, Italian application Ser. No. 25051 A/82, filed Dec. 30, 1982, and in Italian application Ser. No. 25079 A/82, filed Dec. 31, 1982, which corresponds to U.S. application Ser. No. 566,739, now abandoned, and to European application No. EPO 83113201.4) and will not be described in detail.

Downstream of unit 64, the system includes a loader-feeder unit 18. This comprises an inclined channel 80, which is preferably curved in plan view through an arc of about 90°. If the system is mainly for use with frusto-conical reels, the bottom of the channel may advantageously be shaped like a cylindrical-helical arc. Obviously, however, the plan shape and degree of inclination of the channel may differ according to the system's requirements. The initial section of channel 80 is arranged at a lower level than the surface of belt 24. In line with said initial section (FIG. 10a), a wedge 82 can be inserted with a suitable surface for fitting the surface of a reel R. A movable abutment 84 can be fitted to the side of the channel, comprising a head 85 and a rod 86. The abutment can be moved transversally to the channel's axis between a position outside the channel and a piston inside the channel, wherein the head thereof is facing a side thereof at a distance of about the width of a disk-shaped reel.

Close to the downstream portion thereof, the channel comprises a mechanical gate 88, which can move transversally to the channel's axis between a position closing the channel and a position leaving it open. Upstream of the gate a piston-type pusher 90 is provided, having a transversal movement to the channel's axis; the pusher pushes each reel against a fixed stop 91 so as to stop the reel, and in this way it also stops the reels behind the first one.

The channel 80 can be fitted with plate-type sides 93 and 94. Side 93 is pivoted at 95 and side 94 at 96, at opposite ends of the channel, whereas the ends of the plate-type sides opposite the pivoted ones each slide on a pin with a slot thereof, so that they can be adjusted in position and locked apart at the required distance. One of the longitudinal edges of each side protrudes into the channel in such a way, that a reel rolling along the channel is guided by contact with said edges alone.

Downstream of channel 80 the system comprises a further channel or "bowl" 100, with a V-shaped bottom and axis transversal to said channel 80, and an openable door 102. A pusher 104 with a horizontal axis transversal to the axis of channel 80 is provided for pushing each reel R from the bowl towards holding means (of a per se known type) of a device downstream of the system. A control device (not shown) is provided above the pusher 104 for checking the size and attitude of each reel and for actuating the opening of door 102, in case the reel is not proper.

The process for arranging the reels and the way the system operates will now be described.

For frusto-conical reels, the system is prearranged with the slanting plate device 30, the cradle device 68 above belt 24 and a wedge 82 with arc-shaped surface. The flag-shaped device 40 and the abutment 84 are removed. The sides 93 and 94 are set in the widened position.

The frusto-conical reels arrive on belt 22 in a random attitude, i.e. as shown in FIG. 3 (in which they are drawn seen from above) and may have:

(a) the projection of the central axis thereof in the plane of the belt (or in other terms, the cone generatrix on which they are lying) parallel to the belt's axis with the cone smaller end facing forwards;

(b) the projection of the central axis thereof in the plane of the belt parallel to the belt's axis with the cone larger end facing forwards;

(c) the cone axis vertical with the cone smaller end at the top;

(d) the cone axis vertical with the larger end at the top;

(e) the projection of the axis thereof in the plane of the belt arranged obliquely or transversally relative to the belt's longitudinal axis.

The correct position, which is required in the bowl 100, is for example as in 3b, that is, with the reel lying along the belt's axis and its larger end facing forwards. The reels are fed onto belt 24 one by one, that is to say, a new reel can only be supplied to belt 22 for orienting when the preceding reel has left the belt. This can be achieved using known means, not shown.

Figure 3A:
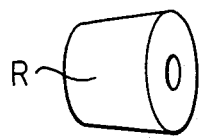
FIGS. 3a, 3b, 3c, 3d and 3e show a frusto-conical reel or cone in the various positions it may assume, seen from above.
Figure 3B:
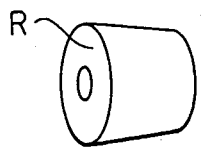
Figure 3C:
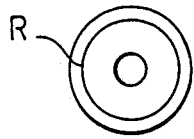
Figure 3D:
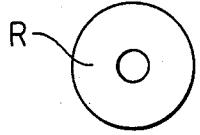
Figure 3E:
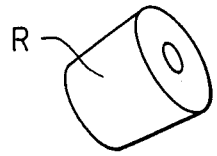

On meeting the slanting plate device 30, any reel in position 3e corrects its position so that the projection of its axis is parallel to the belt's axis, whereas plate 30 has no real effect on a reel in positions shown in FIGS. 3a, b, c and d. Downstream of plate device 30, then, the reel is in one of the positions shown in FIGS. 3a, b, c or d in FIG. 3.

Then the reel is caught between jaws 56a and 56b and the hole-detecting device starts operating. If a vertical hole is detected (position 3c or 3d), the tilting of device 50 is actuated. Said device rotates the jaws holding the reel through 90° around the axis 54, then opens the jaws depositing the reel on belt 22 in an attitude lying along the axis and returns to the lowered position. On leaving device 50, the reel R, is positioned as in 3a or 3b and in this attitude it advances under device 68 which closes blades 68a and 68b and picks up the reel. The detecting device (not shown) of the rotating unit reads the position of the reel's ends. If the larger end is facing forwards, the cradle device 68 rotates through 180° around the vertical axis and deposits the reel in the channel 80 in position 3a. If the smaller end is already facing forwards in position 3a, device 68 moves forward and deposits the reel in channel 80.

Here the reel rolls along the slanting channel, lying along the generatrixes of the frustum of cone, as far as the pusher 90 which stops and blocks it. Then the gate 88 opens and the reel rolls into bowl 100. The control device checks the reel size and attitude and, if suitable, the reel is pushed by pusher 104 against a pick-up device. At this point reel R has its larger base facing forwards. Take note, however, that using the same system and process the reels can also be oriented in a different way than as described so far, that is, for example, with the smaller end facing forwards.

Now the case of a cylindrical reel will be examined. The system is adjusted by arranging device 30 in the path, removing the detecting device of the rotation unit 64, removing abutment 84 from channel 80 and adjusting sides 93 and 94 to the size of the reel or cone.

The cylindrical reels may arrive on belt 22 in any one of attitudes shown in FIGS. 4a, b and c, shown in FIG. 4, that is to say, with their horizontal axis parallel to the belt's axis, or with their axis vertical, or with their axis lateral or oblique relative to the belt's axis. If the reel's axis is lateral or oblique, it is straightened by device 30 and, therefore, downstream of said device the reels can only be in attitude 4a or 4b. Then the reel is held between the jaws 56a and 56b of the tilting device 50 which, as explained in the case of a frusto-conical reel, tilts it through 90° according to whether or not a vertical hole is detected. Thus, downstream of device 50 the reel can only be in attitude 4a. Then it is picked up in this attitude and deposited in channel 80, along which it rolls as far as pusher 90, gate 80 and bowl 100, in the same way as the frusto-conical reel.

For use with disk-shaped reels the system is adjusted by removing device 30, arranging the flag-shaped device 40 on the belt 24, deactivating the tilting unit 47 and deactivating and removing the rotating unit 64 from the belt. Instead abutment 84 is inserted into channel 80 and the sides 93 and 94 are adjusted at the right distance apart to allow a tight passage to the rolling disk-shaped reel with its axis lying horizontally. The disk-shaped reel may arrive on belt 22 in one of the positions a or b in FIG. 5, that is, with its axis lying horizontally (aligned, oblique or lateral relative to the belt's axis) or vertically. The flag-shaped device only acts on those disk-shaped reels which have the axis horizontal causing them to settle in such way, that their axis is always vertical downstream of the flag-shaped device. In this attitude the disk-shaped reel advances on belts 22 and 24 and then drops into channel 80. The effect of the drop is to make the reel lie with its axis horizontal and be held by the abutment. In this attitude said disk-shaped reel rolls along channel 80 as far as pusher 80, gate 88 and beyond, in the same way as in the preceding cases.

It will be realized that in this way a system and process is supplied which is able to orderly arrange reels in the required attitude and is fully automatic, quick and safe.

In addition, the system has the advantage of being easy to adjust for use with frusto-conical reels or cones, with cylindrical or disk-shaped reels.

Obviously all the variations open to a technician in this field can be made to what has been described by this present invention, without exiting from the scope of same.

What I claim is:

1. A process for orienting in a determined attitude frusto-conical yarn reels with a through hole, said reels being bulk fed in a random attitude, comprising the following steps:
   (a) arranging said reels on a path with their axes disposed in one of a vertical position and a position in which the frusto-conical surface of the reel presents at least one generatrix disposed on the surface of the path;
   (b) detecting the existence of a through hole in a predetermined position in said reels;
   (c) as a function of said detection, selectively turning over said reels, so that a generatrix of the frusto-conical surface is lying on the surface of the path;
   (d) detecting the positions relative to one another of the reels' larger and smaller ends;
   (e) as a function of said position detecting step, turning the reels end for end so that a required end is in a required position.

2. A process according to claim 1, wherein said arranging step is carried out by causing the reels to move along a slanting plate device arranged on a length of the path, said device having a first part furthest away from the center line of the path which is higher than the path and a second part nearest the center line which is substantially level with the path.

3. A process for orienting cylindrical yarn reels with a through hole in a determined attitude, said reels being bulk fed in a random attitude, comprising the following steps:
   (a) arranging said reels on a path with their axes in one of a vertical and a horizontal position, parallel to the path's axis;
   (b) detecting the existence of a through hole; and
   (c) as a function of said detecting step, selectively turning over said reels, so that the hole is lying horizontal.

4. A process according to claim 3, wherein said arranging step is carried out by causing the reels to move along a slanting plate device arranged on a length of the path, said device having a first part furthest away from the center line of the path and higher than the path, and a second part nearest to the center line which is substantially level with the path.

5. A system for orderly feeding in a required attitude frusto-conical or cylindrical yarn reels having a through hole, said reels being fed in a random attitude along a path, comprising: a slanting plate device positionable on a section of the path, with its lower part near the path axis and its higher part near an edge of the path; a detecting device for detecting the position of a reel through detection of the through hole in the reel; and a tilting device selectively actuated by the hole detecting device and rotatable around a horizontal axis.

6. A system according to claim 5 comprising a second detecting device for detecting the large end and small end position of frusto-conical reels; and a rotating device for picking up said reels, said rotating device having blades movable from a spread apart position, in which the reel is not engaged, to a closed position, in which the reel is engaged, said rotating device rotating on a vertical axis and being selectively actuated by said second detection device.

7. A system according to claim 5 comprising a channel downstream of said tilting device, said channel having a slanting bottom for gravity-induced motion and adjustable sides extending into the channel and having reel guiding edges.

8. A system according to claim 7 for frusto-conical reels, wherein the bottom of said channel is shaped like a cylindrical-helical arc.

* * * * *